United States Patent Office 3,711,497
Patented Jan. 16, 1973

3,711,497
PROCESS FOR THE PREPARATION OF N-TRITYLIMIDAZOLE
Karl-Heinz Buchel, Leverkusen, Germany, assignor to Farbenfabriken Bayer Aktiengesellschaft, Leverkusen, Germany
No Drawing. Original application Sept. 24, 1968, Ser. No. 762,161. Divided and this application May 15, 1970, Ser. No. 37,850
Claims priority, application Germany, Sept. 26, 1967, F 53,587
Int. Cl. C07d 49/36
U.S. Cl. 260—309                                    7 Claims

ABSTRACT OF THE DISCLOSURE

Reacting an imidazole with a trityl halide (i.e., a triphenyl halomethane) in a polar inert organic solvent having a dielectric constant of at least 4.5 in the presence of an acid-binding agent such as an excess of the imidazole or a tertiary amine, at about 0–100° C., to form the corresponding N-tritylimidazole.

---

This is a divisional of my copending application Ser. No. 762,161, filed Sept. 24, 1968, now abandoned.

The present invention relates to and has for its objects the provision for particular new methods of producing N-tritylimidazoles, which are known fungicides for combating fungi pathogenic to plants, e.g. in a simple reaction, using readily available starting materials whereby to attain outstanding yields, with other and further objects of the invention becoming apparent from a study of the within specification and accompanying examples.

It is known (see Chem. Ber. 92, 92–98 [1959]) that N-tritylimidazoles are obtained when silver salts of imidazoles are reacted with triphenylchloromethane, i.e. trityl chloride, in boiling benzene. This process, however, has many disadvantages. The silver salts of the imidazoles have to be prepared separately and are expensive. The yields in the case of the initial silver salt preparation reaction are very low and generally lie between 11.5 and 49.7% According to this known process, the ultimate N-tritylimidazole is obtained only in about 27% yield. Furthermore, it is expressly stated that in the reaction of free imidazole, instead of the silver salt, with triphenylchloromethane in benzene no homogeneous reaction product is formed and, when the components are heated without solvents, only resins are obtained.

It has now been found in accordance with the present invention that a versatile and smooth process may be provided for the production, in favorable yields and high purity, of N-tritylimidazoles having the general formula

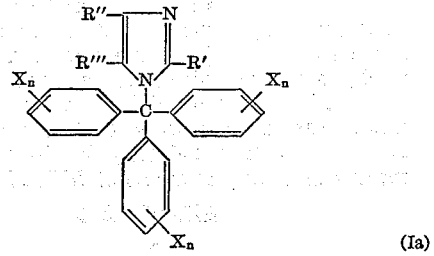

(Ia)

in which
X is halogen, alkyl, alkoxy or nitro,
n is 0, 1 or 2,
R′ is hydrogen, alkyl or aryl,
and either
R″ is hydrogen, alkyl or aryl, and
R‴ is hydrogen, alkyl or aryl, or
R″ and R‴, together with the ethylene bridge to which they are shown attached, form a benzene ring,
which comprises reacting an imidazole having the formula

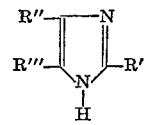

(IIa)

in which
R′, R″ and R‴ are the same as defined above,
with a trityl halide having the formula

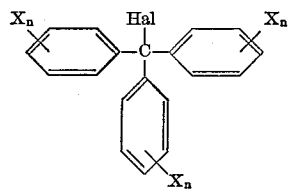

(IIb)

in which
X and n are the same as defined above, and
Hal is halogen, such as chloro, bromo, iodo or fluoro, especially chloro, in a polar inert organic solvent having a dielectric constant of at least 4.5 at a temperature of substantially between about 0 to 100° C. in the presence of an acid binder.

It is very surprising that in the process according to the present invention the desired N-tritylimidazoles are formed and in a high yield, since it is known that when the components are reacted in benzene no reaction product can be isolated and when heated without solvents only resins are obtained.

The process of the present invention exhibits great advantages in comparison with the known silver salt method. For example, the N-tritylimidazoles are obtained herein by a one-step reaction and the products can be formed in very high yields and with great purity.

For instance, if imidazole and trityl chloride are used as starting materials, the instant reaction can be represented by the following typical formula scheme:

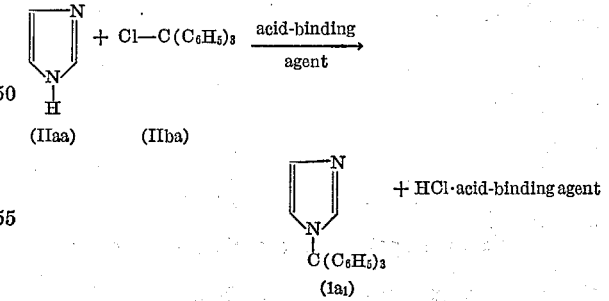

The necessary starting materials are clearly characterized by the Formulae IIa and IIb above. Such starting materials are already known.

Advantageously, in accordance with the present invention, in the various formulae herein:

X represents—
halogen such as chloro, bromo, fluoro and/or iodo, especially chloro, bromo, fluoro and mixed chlorobromo, chloro-fluoro and bromo-fluoro;
straight and branched alkyl such as lower alkyl, especially having 1–4 carbon atoms, including methyl, ethyl, n- and iso-propyl, n-, iso-, sec.- and tert.-butyl, and the like, and particularly methyl;

straight and branched chain alkoxy such as lower alkoxy, especially having 1–4 carbon atoms, such as methoxy, ethoxy, n- and iso-propoxy, n-, iso-, sec.- and tert.-butoxy, and the like, and particularly methoxy; or nitro;

$n$ is a whole number from 0 to 2, i.e. 0, 1 or 2, and especially 0;

R' represents—
  hydrogen;
  straight and branched alkyl such as lower alkyl, especially having 1–4 carbon atoms, as defined above, and particularly methyl; or
  aryl such as aryl having 6–10 carbon atoms, including phenyl, naphthyl, and the like, and particularly phenyl; and R" and R'" each individually represents—
  hydrogen, alkyl or aryl as defined above for R';

with the proviso that R" and R'" when taken together with the adjacent ethylene bridge of the imidazole ring to which they are attached form a corresponding benzene ring, i.e. form a benzimidazole moiety.

Preferably, $n$ is 0, R', R" and R'" each individually is hydrogen or $C_{1-4}$ alkyl, or R" and R'" when taken together with the adjacent ethylene bridge form a corresponding benzimidazole ring.

The solvent used in accordance with the present invention is a polar inert organic solvent having a dielectric constant (D) of at least 4.5 and up to about 180; the preferred range lies between about 15 and about 50. Such solvents include for example nitriles, such as acetonitrile (D=37.5), propionitrile, butylnitrile; sulfoxides, such as dimethyl sulfoxide (D=48.9); formamides, such as formamide, N-methylformamide (D=182.4), N-methylacetamide (D=169.7), dimethyl formamide; ketones, such as acetone (D=20.7), methylethylketone, diethylketone, dipropylketone, diisopropylketone, cyclohexanon as well as mono- and di-lower alkyl-cyclohexanones and mestityloxide; nitro compounds, such as nitromethane (D=35.8) or nitrobenzene (D=34.5); unsymmetrical chlorinated hydrocarbons, such as chloroform (D=4.8) as well as ethylenechloride (D=10.0), mono- and dichlorobenzenes; ethers such as diethylether, diisopropylether, dibutylether, tetrahydrofurane; sulfones, such as tetramethylenesulfone; etherglycolacetates, such as ethyleneglycol - monomethyletheracetate, -monoethyletheracetate, and -monobutyletheracetate; esters of lower aliphatic carbonic, i.e. carboxylic acids with 1 to 5 carbon atoms with alcohols having up to 8 carbon atoms, such as acetic acid ethylester, acetic acid butylester, butyric acid methylester, and butyric acid ethylester; cyanoacetic acid esters with alcohols having up to 8 carbon atoms, such as cyanoacetic acid ethylester and acetoacetic acid ethylester. Particularly good are polar inert organic solvents which have a dielectric constant of more than 15. Preferred solvents for the reaction are nitriles and ketones.

The solvents lying within the above-mentioned range of the dielectric constant (D) can, of course, also be used in mixtures.

Thus, the instant polar inert organic solvents generally contemplate lower aliphatic, especially lower, e.g. $C_{1-5}$, alkanoic, acid nitriles; dilower, e.g. $C_{1-5}$, alkyl-sulfoxides and -formamides; lower aliphatic, especially lower, e.g. $C_{1-5}$, alkyl, ketones and particularly di-$C_{1-4}$ lower alkyl ketones; nitro lower, e.g. $C_{1-5}$, alkanes; unsymmetrical chlorinated alkanes, especially chlorinated lower, e.g. $C_{1-5}$ alkanes; and the like; all of which have a dielectric constant of at least 4.5, and preferably more than 15.

The reaction is carried out in the presence of an acid binder, i.e. acid-binding agent. Preferably, a suitable excess of the corresponding imidazole, or a tertiary amine, such as trialkyl, especially trilower, e.g. $C_{1-5}$, alkyl, amine including dialkyl, especially dilower, e.g. $C_{1-5}$, alkyl, -benzyl amine including dimethyl benzyl amine, or pyridine is used. However, the organic acid binders otherwise customarily used may also be employed. It is, of course, also possible to use as polar inert organic solvent a liquid acid binding agent if its dielectric constant lies within the above-mentioned range. It is from 4.5–180, preferably 15–50.

The reaction temperatures can be varied advantageously within a fairly wide range. In general, the instant reaction is carried out at temperatures substantially between about 0–100° C., and preferably between about 45–90° C.

When carrying out the production process of the present invention, the starting materials are generally used in approximately equimolar amounts, and an approximately equimolar amount of the acid binder is also used advantageously. The reaction time depends on the reaction temperature, as the artisan will appreciate, and generally is from 3 to 24 hours. In the working up of the reaction mixture, the solvent is removed, e.g. by vacuum distillation, and the reaction product may be freed from amine hydrochloride by washing with water or, if the amine hydrochloride is sparingly soluble in water, the reaction product may be separated from the hydrochloride with any suitable organic solvent, e.g. of the foregoing type or generally one in which the amine hydrochloride is insoluble.

The N-tritylimidazoles which are prepared by the process of the present invention are known to be fungicidally effective against numerous fungi pathogenic to plants (see U.S. Pat. 3,321,366). Furthermore, the N-tritylimidazoles obtainable in accordance with this process show antimycoatic activity (see German patent appl. No. F 53 504 IVa/30h, corresponding to copending U.S. Ser. No. 758,594, filed Sept. 9, 1968).

The production process of the present invention is illustrated, without limitation, by the following examples:

EXAMPLE 1

(1) 27.4 g. (0.4 mol) imidazole and 55.6 g. (0.2 mol) triphenylchloromethane are dissolved in 500 ml. acetonitrile and heated to 82° C. for 3 hours. The acetonitrile is then distilled off in a vacuum and the residue is taken up in boiling xylene. The imidazole hydrochloride remains behind largely undissolved. From the xylene which is filtered off, the N-tritylimidazole crystallizes out in coarse, colorless needles after cooling. Yield: 61 g. (98% of the theory). Again recrystallized from xylene, M.P. 227–228° C.

(2) The reaction is carried out as stated under (1). The crude product is, however, thoroughly washed with water, the imidazole hydrochloride being dissolved out. The product is dried and recrystallized from xylene or a little acetone. 56 g. (90% of the theory) of N-tritylimidazole of M.P. 227–228° C. are obtained.

(3) 3.4 g. (0.05 mol) imidazole are heated with 13.9 g. (0.05 mol) triphenylchloromethane in 120 ml. acetonitrile to 80–82° C. for 3 hours, during which 5 g. triethyl amine are added. The acetonitrile is then distilled off in a vacuum and the triethylamine hydrochloride is washed out with water. The residue, after recrystallization from xylene, yields 14 g. (90% of the theory) of N-tritylimidazole of M.P. 227° C.

EXAMPLE 2

16.4 g. (0.2 mol) 2-methylimidazole and 27.9 g. (0.1 mol) triphenylchloromethane are heated to the boil in 200 ml. acetonitrile. The acetonitrile is evaporated to onehalf its original volume, the precipitated solid substance which forms is filtered off with suction and dissolved in hot xylene. Filtration from residual, undissolved hydrochloride is effected. From xylene there crystallizes 22 g. (68% of the theory) of 2-methyl-N-tritylimidazole of M.P. 225° C.

In analogous manner, the following compounds are obtained:

2,4-(5)-dimethyl-N-tritylimidazole

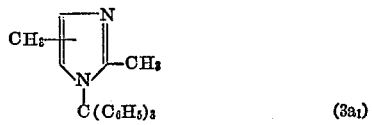
(3a₁)

M.P. 232° C.

It is not clear to which nitrogen the trityl group is attached.

N-tritylbenzimidazole

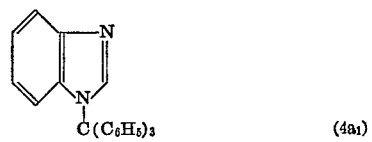
(4a₁)

M.P. 180–181° C.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A process for the production of N-trityl-imidazole of the formula:

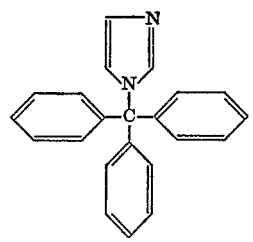

which consists essentially of reacting imidazole of the formula:

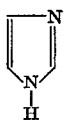

with a trityl halide of the formula:

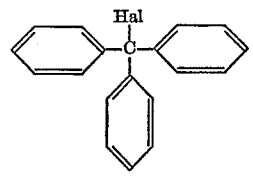

wherein Hal is halogen, in a polar inert organic solvent having a dielectric constant greater than 15 at a temperature substantially between about 0° C. to 100° C. in the presence of an organic acid binding agent.

2. A process according to claim 1, wherein said solvent has a dielectric constant of 15 to about 50.

3. A process according to claim 1, wherein said temperature is between about 45° C. to 90° C.

4. A process according to claim 1, wherein said solvent is selected from the group consisting of acetonitrile, propionitrile, butylnitrile, dimethyl sulfoxide, formamide, N-methylformamide, N-methylacetamide, dimethyl formamide, acetone, methylethylketone, diethylketone, cyclohexanon, mesityloxide, nitromethane, nitrobenzene, tetramethylenesulfone, ethyleneglycol - monomethyletheracetate, ethyleneglycol-monoethyletheracetate, ethyleneglycol-monobutyl-etheracetate, cyanoacetic acid ethylester and acetoacetic acid ethylester.

5. A process according to claim 1, wherein an excess of said organic acid binding agent is used and said agent is selected from the group consisting of the corresponding starting imidazole and a tertiary amine.

6. A process according to claim 1, wherein at least the stoichiometric amount of said imidazole is used and said solvent is acetonitrile.

7. A process according to claim 6, wherein at least the stoichiometric amount of said organic acid binding agent is used.

References Cited

UNITED STATES PATENTS

| | | | |
|---|---|---|---|
| 3,244,726 | 4/1966 | Karmas | 260—309 |
| 3,259,622 | 7/1966 | Shen et al. | 260—309 |
| 3,321,366 | 5/1967 | Mussell et al. | 260—309 |
| 3,391,156 | 7/1968 | Beaman et al. | 260—309 |

OTHER REFERENCES

Fournari et al.: Bul. Soc. Chim., France, 1968, pp. 2438–46 (June 1968).

Giesemann et al.: Chem. Abstr., vol. 53, columns 10190–1 (1959).

Giesemann et al.: Chem. Berichte, vol. 92, pp. 92–8 (1959).

Giesemann et al.: Chem. Abstr., vol. 54, columns 15368–9 (1960).

Giesemann et al.: Chem. Berichte, vol. 93, pp. 570–6 (1960).

Kittila: Dimethylformamide Chemical Uses, pp. viii and 10–4, Wilmington, E. I. du Pont de Nemours & Co., 1967.

Parker In: Raphael et al., Advances in Organic Chemistry, vol. 5, pp. 2, 3, and 22–4, New York, Interscience-Wiley, 1965.

NATALIE TROUSOF, Primary Examiner

U.S. Cl. X.R.

260—309.2, 389, 395, 999